(No Model.)

C. F. CORY.
ROTARY ENGINE.

No. 267,675. Patented Nov. 21, 1882.

Attest:
Charles Pickles
Albert G. Fish

Inventor:
Charles F. Cory
By Knight Bros.
Attys

UNITED STATES PATENT OFFICE.

CHARLES F. CORY, OF SOUTH ST. LOUIS, MISSOURI.

ROTARY ENGINE.

SPECIFICATION forming part of Letters Patent No. 267,675, dated November 21, 1882.

Application filed September 12, 1882. (No model.)

*To all whom it may concern:*

Be it known that I, CHARLES F. CORY, of South St. Louis, in the State of Missouri, have invented a certain new and useful Improvement in Rotary Engines, of which the following is a full, clear, and exact description, reference being had to the accompanying drawings, forming part of this specification.

This engine may be driven by either air or steam, and with one or more tangential jets.

The features of my invention are set forth in the claims.

Figure 1:
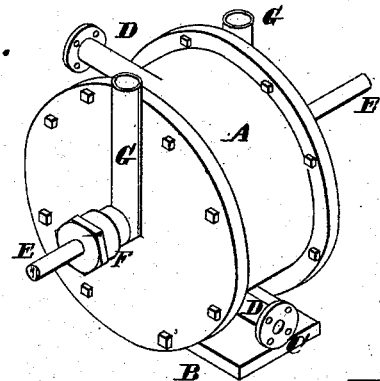
Figure 2:
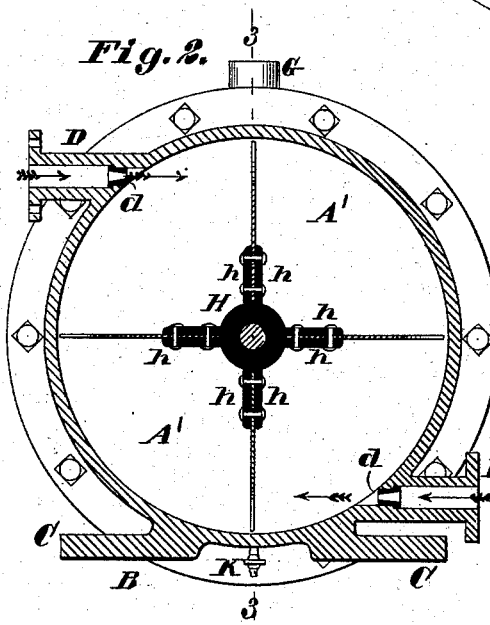
Figure 3:
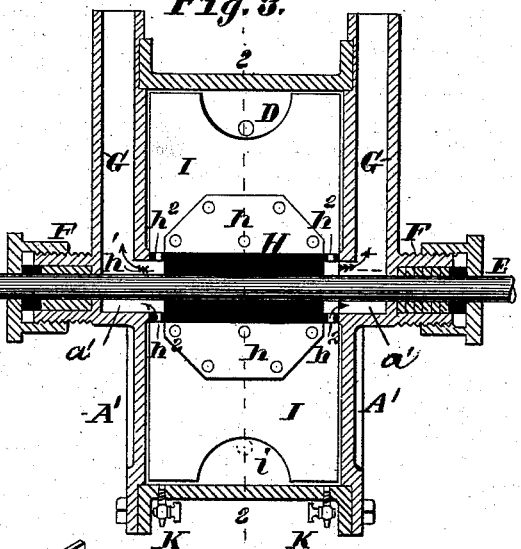
Figure 4:
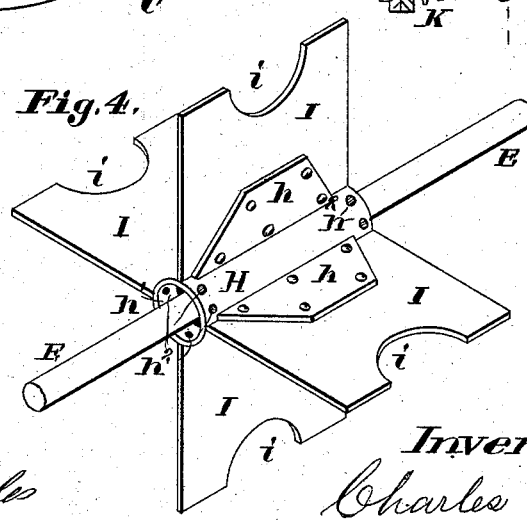

Figure 1 is a perspective view. Fig. 2 is a section at 2 2, Fig. 3. Fig. 3 is a section at 3 3, Fig. 2. Fig. 4 is a perspective view of the rotary piston.

A is the cylinder, shown supported upon a bed, B, by legs or lugs C, secured to the bed. The cylinder is shown with its ends A' vertical; but it is not necessarily placed in this position, for the engine will operate in any position. Either or both of the cylinder-heads may be removable, the same being fitted to the end of the cylinder proper with a ground or other tight joint.

D are the induction-pipes, through which compressed air or steam enters the cylinder in a direction nearly or quite tangential to the circumference of the cylinder. I prefer that the air or steam jet or current should be in a direction tangential to a circle inside the circumference of the cylinder, so that the jet shall be directed upon the piston-wings in the most effective manner.

$d$ is the jet-orifice.

The piston is carried on a shaft, E, extending axially through the cylinder and through stuffing-boxes F at its ends. I prefer to use metal packing in the boxes F, because they form journal-bearings for the shaft as well as prevent the escape of the air or steam from the interior of the cylinder. The cylinder exhausts at the center of the heads through passages G. The piston-shaft has upon it a hub, H, with radial plates $h$, to which the piston-wings I are secured by rivets or otherwise. The piston-wings I should be made of "saw-steel," in order that they may bear the very high velocity at which the piston rotates.

In the ends of the hubs are annular chambers $h'$, in communication with the annular exhaust-chambers $a'$ in the heads, and the hub has a number of holes, $h^2$, forming a communication between the interior of the cylinder and the annular chambers $h'$, so that the exhaust air or steam passes from the interior of the cylinder through the holes $h^2$ and annular chambers $h'$ and $a'$, (surrounding the piston-shaft,) and so out through the exhaust-passages G. The annular ends of the hub bear against the cylinder-heads, which are made with annular bearings therefor.

The piston-wings I are made to fit the inside of the cylinder as near as may be without any danger of actual contact, except that in the outer edge of each piston-wing is a recess at $i$, through which the jet-current passes when the wing arrives at the jet-hole $d$. Thus there is never any direct impediment to the entrance of the jet into the cylinder, and the air or steam, as the case may be, may pass to a limited extent through the apertures $i$, and act upon the wings in advance.

I have shown two induction pipes and jets, but do not confine myself to any particular number. I may use one or more.

K are waste-cocks to let off condensed water from the cylinder.

Either end of the piston-shaft may be used to drive machinery, either by direct connection or through the medium of cog-wheels or belt and pulley; or both ends of the piston-shaft may be used for this purpose.

It will be observed that the jets, owing to the direction in which they enter the cylinder, will act by suction to draw forward the wings I when approaching the jets.

I claim herein as new and of my invention—

1. The combination, in a rotary engine, of the piston with wings running free in the cylinder, fixed cylinder with induction-jet passing tangentially through the circumference of the cylinder, and exhaust-port at the center of the cylinder-chamber, substantially as set forth.

2. In a rotary engine, the piston-wings I, made with aperture $i$ in line with the jet $d$, substantially as set forth.

3. In combination with the fixed cylinder with tangential induction-port in the circumference thereof, the loose-fitting piston made with chamber $h'$ in the hub communicating with the cylinder-chamber through holes $h$, and also with exhaust-passage G, substantially as set forth.

4. The combination, in a rotary engine, of the tangential induction pipe and jet D $d$, the piston with wings I, having recesses or apertures $i$, the hub with chamber $h'$, and the exhaust-passage $h^2$ $a$ G, substantially as set forth.

CHARLES F. CORY.

Witnesses:
SAML. KNIGHT,
ALBERT G. FISH.